(12) United States Patent
Mathieu

(10) Patent No.: US 6,241,183 B1
(45) Date of Patent: Jun. 5, 2001

(54) METHOD FOR CONTROLLING AN AEROPLANE CONTROL SURFACES TO COUNTER GROUND LATERAL DRIFT

(75) Inventor: Gérard Mathieu, Pibrac (FR)

(73) Assignee: Aerospatiale Societe Nationale Industriele, Paris (FR)

( * ) Notice: Subject to any disclaimer, the term of this patent is extended or adjusted under 35 U.S.C. 154(b) by 0 days.

(21) Appl. No.: 09/341,292

(22) PCT Filed: Nov. 10, 1998

(86) PCT No.: PCT/FR98/02399

§ 371 Date: Sep. 14, 1999

§ 102(e) Date: Sep. 14, 1999

(87) PCT Pub. No.: WO99/24317

PCT Pub. Date: May 20, 1999

(30) Foreign Application Priority Data

Nov. 12, 1997 (FR) .................................................. 97 14160

(51) Int. Cl.⁷ .................................................. B64C 13/00
(52) U.S. Cl. .......................................................... 244/75 R
(58) Field of Search ............................... 244/75 R, 90 R, 244/90 A, 183

(56) References Cited

U.S. PATENT DOCUMENTS

| 4,143,839 | 3/1979 | Antonov et al. . | |
|---|---|---|---|
| 4,744,532 | * 5/1988 | Ziegler et al. | 244/75 R |
| 5,127,608 | * 7/1992 | Farineau et al. | 244/75 R |
| 5,375,793 | * 12/1994 | Rivron et al. | 244/75 R |

FOREIGN PATENT DOCUMENTS 2694738   2/1994   (FR) .

OTHER PUBLICATIONS

Patent Abstracts of Japan vol. 016, No. 270 (M–1266), 17 Juin 1992 & JP 04 066394 A, (Mitsubishi Heavy Ind Ltd), 2 mars 1992.

* cited by examiner

Primary Examiner—Charles T. Jordan
Assistant Examiner—Francis T. Palo
(74) Attorney, Agent, or Firm—Burns, Doane, Swecker & Mathis LLP

(57) ABSTRACT

A control process for the control surfaces of an aircraft to prevent lateral deviation of the trajectory on the ground during a landing or interrupted takeoff, in which the spoilers are extended asymmetrically.

9 Claims, 3 Drawing Sheets

METHOD FOR CONTROLLING AN AEROPLANE CONTROL SURFACES TO COUNTER GROUND LATERAL DRIFT

DESCRIPTION

1. Technical Domain

This invention relates to a control process for aircraft control surfaces to prevent lateral deviation of the trajectory on the ground.

2. State of Prior Art

Some actions, for example cross wind, engine failure, thrust reverser failure, etc., may cause lateral deviation of the trajectory of an aircraft on the ground.

Thus French patent No. 2 694 738 describes a control process for aircraft control surfaces to compensate for lateral deviation of the trajectory at low speed during a take-off phase.

However, this invention relates to a landing phase or an interrupted take-off phase.

When the aircraft is on the runway during a landing phase, one of the pilot's objectives is to stop the aircraft while keeping it on the runway. Considering the stability of the moving aircraft, the cross wind component is a disturbance that tends to move the aircraft away from the required trajectory. The pilot can control this trajectory by acting on:

aerodynamic forces;

and/or driving forces;

and/or ground reaction forces.

Aerodynamic Forces

The aircraft speed creates aerodynamic lift. Thus if the speed is not zero, only part of the weight of the aircraft is supported by the landing gear.

The aircraft drag creates a force that tends to slow the aircraft.

The purpose of ground spoilers is to significantly reduce the wing lift and to "push" the aircraft down onto the ground, which increases the braking efficiency. They also increase the drag coefficient Cx of the aircraft and participate in deceleration.

The cross wind generates a yaw torque proportional to the aerodynamic sideslip. This torque tends to move the aircraft away from the runway center line. "The aircraft wants to turn into the wind". The aerodynamic sideslip increases as the aircraft decelerates. The cross wind also generates a lateral force.

The rudder generates a yaw torque that helps to resist the torque due to the cross wind. It also generates a lateral force.

The cross wind also generates a roll torque that causes an asymmetric distribution of the forces supported by the main sets of landing gear. The ailerons or roll surfaces (spoilers) and the rudder also generate a roll torque.

The main effect of the pitch control surfaces (elevators) is to modify the load supported by the nose landing gear.

A yaw movement also generates a yaw torque which resists the movement.

Driving Forces

The use of thrust reversers contributes to deceleration of the aircraft. They generate a torque which modifies the load supported by the nose landing gear. Furthermore, they increase the stability of the aircraft during motion and can reduce the efficiency of the ground spoilers.

Asymmetric use of the engine thrust (in direct or inverse jet) can generate a yaw torque.

Ground Reaction Forces

The main landing gear sets, the central landing gear and the nose landing gear support all or some of the weight of the aircraft.

The position of the landing gear naturally has a stabilizing effect on the trajectory, secondly running friction tends to slow the aircraft.

The aircraft deceleration may be increased by action on the brakes. The antiskid system ensures that maximum grip capacity on the ground is achieved by producing a tangential force directly proportional to the vertical load supported by each landing gear. The maximum braking force that can be applied through the tires increases as the vertical load supported by the landing gear increases.

If the vertical loads supported by the main left and right landing gear sets are unequal, symmetric action on the brakes will create a braking force, and also a yaw torque.

The authority of the nose landing gear varies as a function of the speed, and can generate a yaw torque (by action on the pedals or the tiller). This nose landing gear will be more efficient as the vertical load supported by it increases.

Thus, the lateral trajectory of an aircraft on the ground is now controlled by:

the rudder;

the nose landing gear;

differential braking;

more rarely, asymmetric thrust.

The purpose of the invention is a process for using the ailerons and spoilers to control this lateral trajectory.

DESCRIPTION OF THE INVENTION

This invention relates to a process for controlling the control surfaces of an aircraft to resist lateral deviation of the trajectory on the ground when landing or during an interrupted take-off, in which the rudder is turned to resist this deviation, and all spoilers are extended to increase the pressure of the aircraft on the ground, characterized in that the spoilers are extended asymmetrically, by retracting at least one of the spoilers on the wing opposite the side towards which the rudder is turned.

In one embodiment of the invention, these spoilers are retracted following an order from the rudder pedal. Advantageously, these spoilers are retracted when the rudder pedal is turned by more than 20°.

These spoilers may advantageously be retracted progressively; for example, none of these spoilers will be retracted if the rudder pedal is turned by less than 20°, and all these spoilers will be retracted if the rudder pedal is turned by more than 28°.

The action of the rudder pedal on the spoilers may be a function of the aircraft speed. Thus, the pedals will have no effect on the spoilers if the aircraft speed exceeds 110 knots; the pedals may have an effect on the spoilers at a speed of less than 100 knots, and the spoilers are retracted progressively between these two speeds.

DETAILED DESCRIPTION OF ONE EMBODIMENT

The invention consists of retracting all or some spoilers on the wing opposite the side towards which the rudder is turned, during landing (or an interrupted take-off) with the ground spoilers extended.

This has two effects:

the aerodynamic yaw moment due to the asymmetric extension of the spoilers is additional to the yaw moment due to the rudder;

the generated roll moment modifies the load on the main landing gear, increasing the authority of the differential braking.

An extended control surface will increase drag. Thus turning the control surfaces asymmetrically as shown in FIGS. 1 and 2, induces an aerodynamic yaw torque which has a positive effect.

Figure 1:
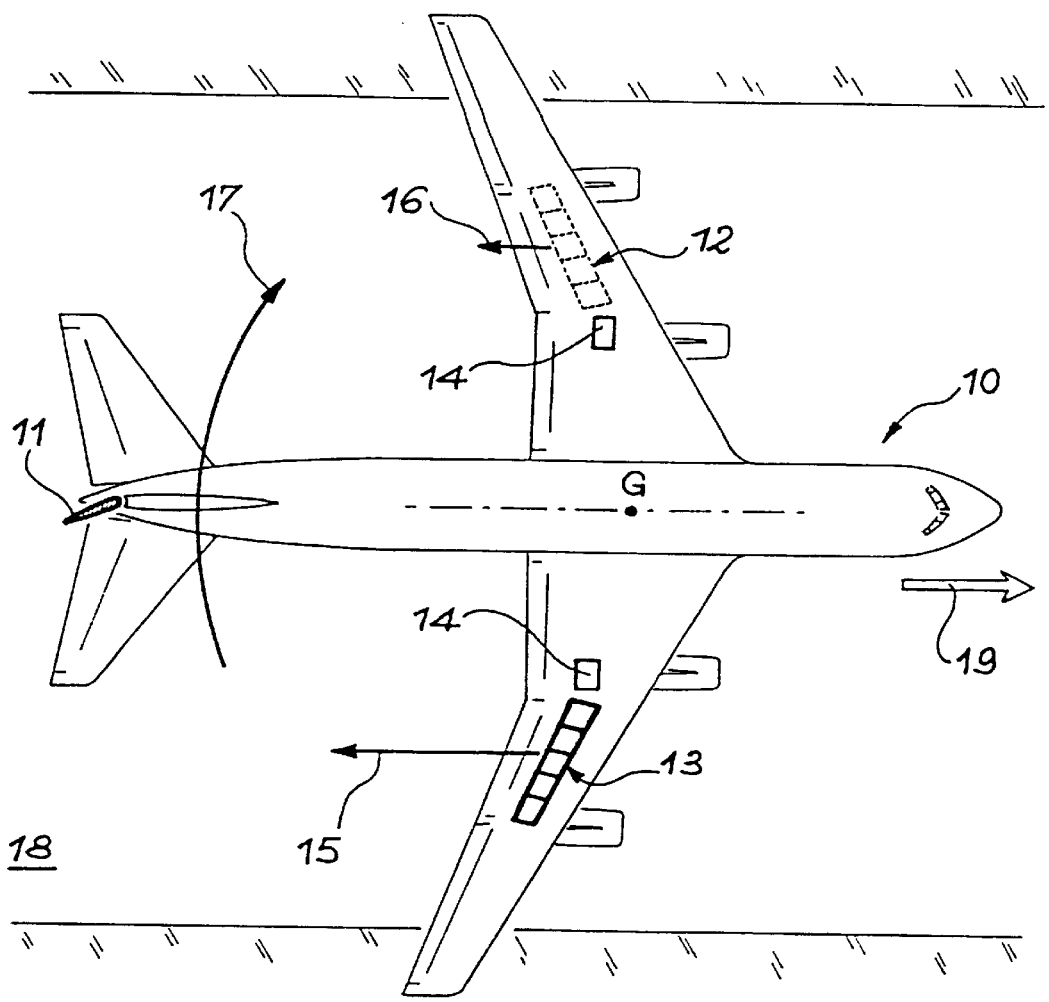
FIGS. 1 and 2 show a top view and a rear view of an aircraft respectively, during a landing or interrupted take-off phase, using the process according to the invention.
Figure 2:
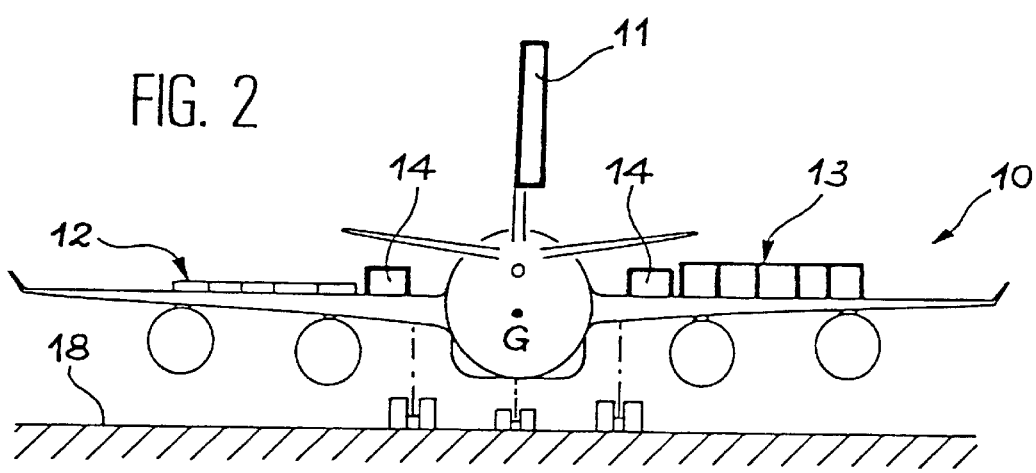

FIGS. 1 and 2 illustrate a top view and a rear view respectively, of an aircraft 10 during a landing or interrupted take-off phase. In these figures, the rudder 11 is turned and the spoilers 12 on the wing opposite the side towards which the rudder is turned are retracted, whereas the spoilers 13 on the other wing are extended. FIG. 1 shows the landing runway 18 and the aircraft speed 19. FIG. 2 also shows the ailerons 14, the position of which does not depend on the rudder pedals, and the center of gravity G. The drag 15 from the wing on which the spoilers 13 are extended is greater than the drag 16 on the wing on which the spoilers 12 are retracted. The arrow 17 illustrates the yaw torque.

The asymmetric extension of the ailerons 14 and spoilers 12, 13 generates a roll torque. This roll torque modifies the distribution of vertical loads on the main landing gear sets. The main landing gear set on the side towards which the rudder is turned will support a higher load. Thus the braking efficiency of this landing gear is increased. This asymmetric braking force generates a braking yaw torque. This effect is positive in controlling the lateral trajectory of the aircraft.

Figure 3:
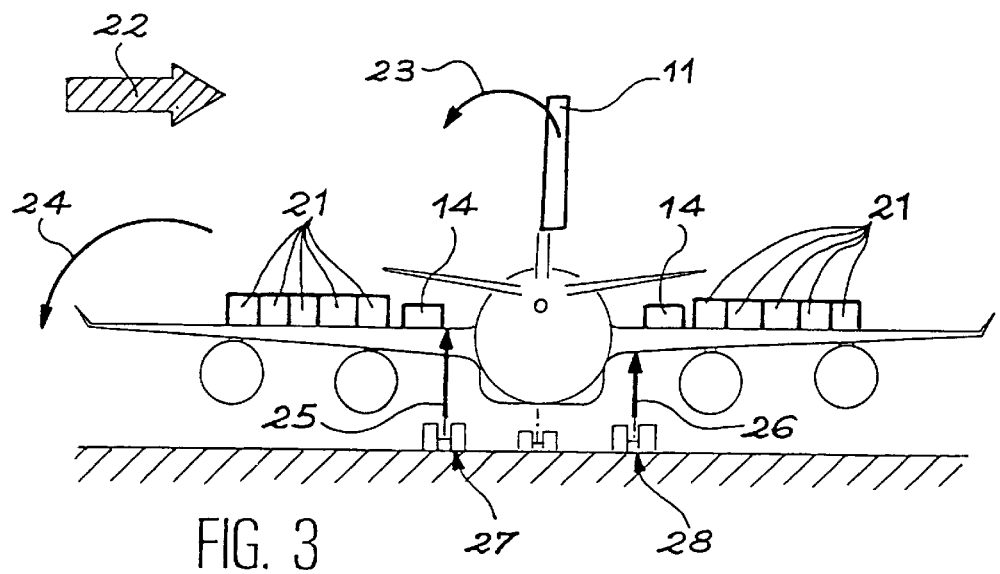
FIG. 3 illustrates a rear view of an aircraft in a landing or interrupted take-off phase, with side wind, without using the process according to the invention.

FIG. 3 illustrates the current configuration of ailerons 14, spoilers, and the rudder 11, when landing in a cross wind 22.

Arrows 23 and 24 illustrate the roll moment due to the rudder 11, and the roll moment generated by the wings respectively, whereas arrows 25 and 26 illustrate the load supported by the main landing gear sets 27 and 28 respectively.

Figure 4:
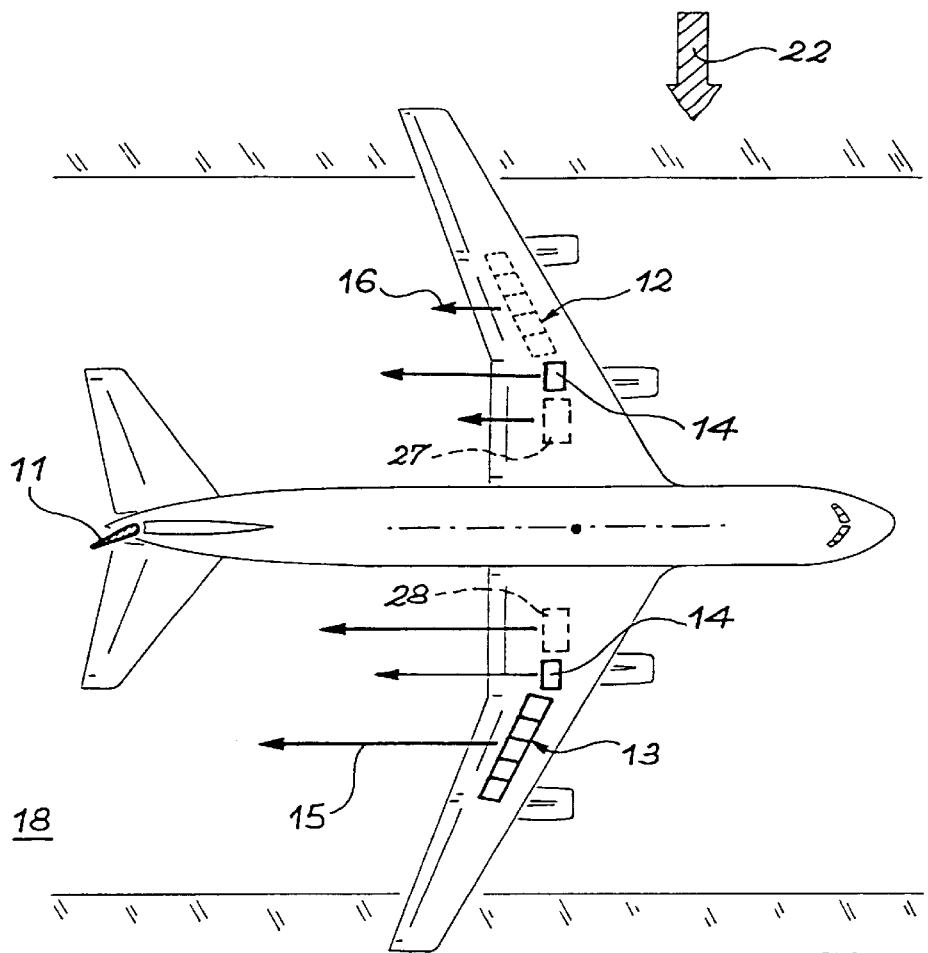
Figure 5:
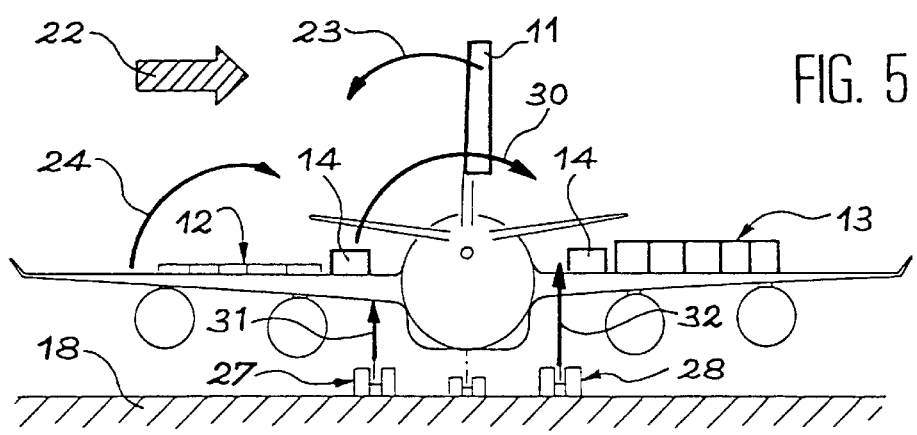

FIGS. 4 and 5 illustrate a top view and a rear view respectively of an aircraft in a landing or interrupted take-off phase, for which the process according to the invention was used. The same references were used in these figures as in previous figures.

Arrow 30 illustrates the roll torque created by the asymmetric extension of the spoilers 12 and 13. Arrows 31 and 32 illustrate the new distribution of vertical loads on the main landing gear sets 27 and 28.

In one advantageous embodiment of the process according to the invention, spoilers are retracted following an order from the rudder pedal (total or partial retraction of all or some of the spoilers). For example, with a maximum turn of the rudder pedal equal to 30°:

if the rudder pedal is turned by less than 20°, there is no effect on the spoilers;

if the rudder pedal is turned by more than 28°, the spoilers are entirely retracted;

spoilers are gradually retracted between these two turning values of the rudder pedal.

Ailerons are not used in this case; thus, the stick maintains some authority in roll.

Activation may depend on the aircraft speed, for example:

above 110 knots, the pedals have no effect on the spoilers;

below 100 knots, the modification is active;

application is progressive between these two speeds.

Thus the invention consists of partially retracting the spoilers on the wing opposite the side towards which the rudder is turned (the wing on the windward side), during landing or an interrupted take-off with the ground spoilers extended and at low speed.

This has a two-fold effect:

the aerodynamic yaw torque due to asymmetric extension of the spoilers is additional to the aerodynamic yaw torque due to the rudder;

the roll torque created modifies the load on the main landing gear, increasing the differential braking authority.

Figure 6:
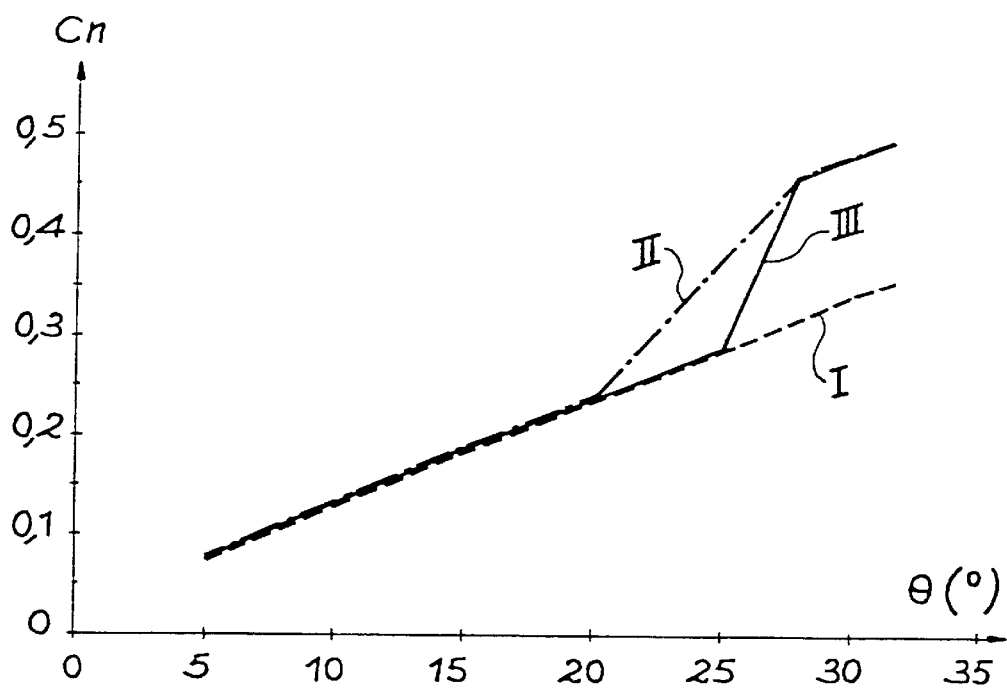

FIG. 6 illustrates the aerodynamic efficiency of the rudder pedal in yaw for an aircraft speed equal to 80 knots. There are thus three curves for the yaw torque Cn as a function of the angle $\theta$ of the rudder pedal, as follows:

curve I for the existing configuration shown in FIG. 3;

curves II and III making use of the process according to the invention as illustrated in FIGS. 4 and 5, with spoilers beginning to retract at 20° and 25° respectively.

What is claimed is:

1. Process for controlling the control surfaces of an aircraft to resist lateral deviation of the trajectory on the ground when landing or during an interrupted take-off, the process comprising:

turning a rudder to resist the deviation;

extending spoilers to increase the pressure of the aircraft on the ground, wherein the spoilers are extended asymmetrically, and at least one of the spoilers is retracted, on the wing opposite the side towards which the rudder is turned; and activating the retraction of the spoilers by an order from a rudder pedal.

2. The process according to claim 1, wherein the spoilers are retracted when the rudder pedal is turned by more than 20°.

3. The process according to claim 1, wherein the spoilers are retracted gradually.

4. The process according to claim 3, wherein none of the spoilers are retracted if the rudder pedal is turned by less than 20°.

5. The process according to claim 3, wherein all the spoilers on the side opposite the side towards the rudder are retracted if the rudder pedal is turned by more than 28°.

6. The process according to claim 1, wherein the activation of the spoilers depends on the aircraft speed.

7. The process according to claim 6, wherein the rudder pedals have no effect on the spoilers for an aircraft speed exceeding 110 knots.

8. The process according to claim 6, wherein the rudder pedals are effective on the spoilers for a speed less than 100 knots.

9. The process according to claim 6, wherein the spoilers retract progressively between 100 knots and 110 knots.

* * * * *